Nov. 2, 1954 H. G. BECK 2,693,035
TEMPLATE ADAPTED FOR THE USE OF TYPISTS
Filed June 17, 1952
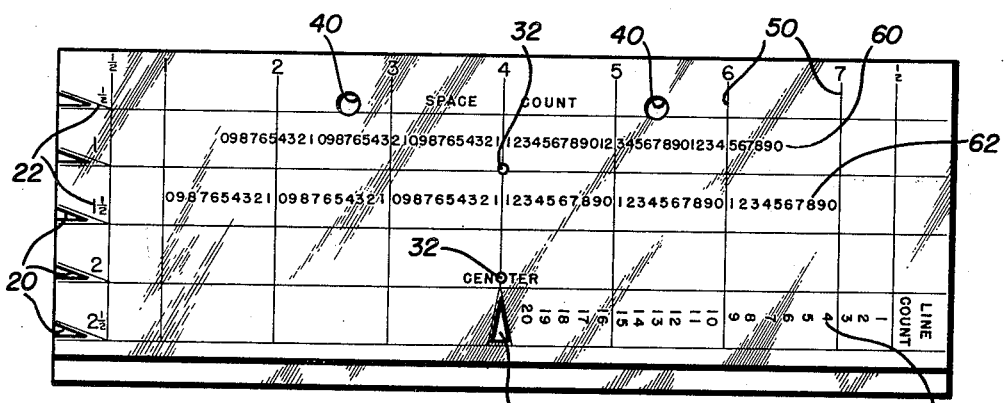
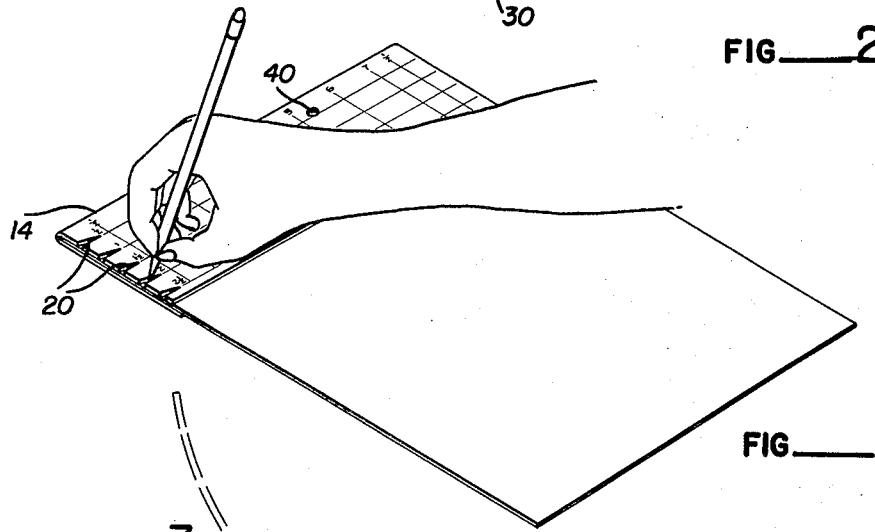
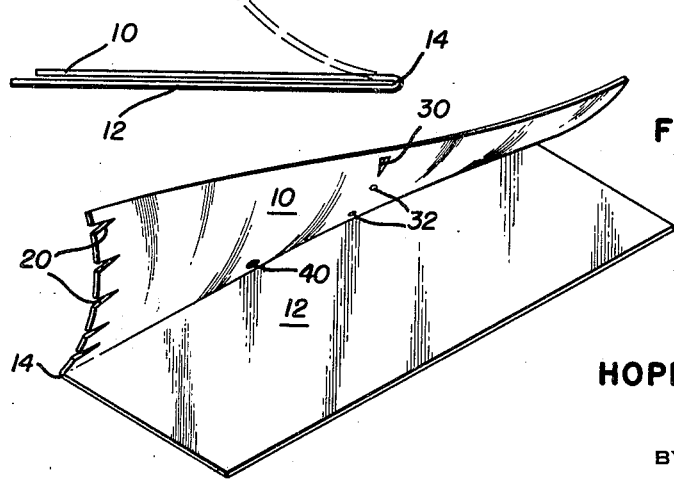
HOPE G. BECK
INVENTOR
BY Smith & Tuck
ATTORNEYS

United States Patent Office 2,693,035
Patented Nov. 2, 1954

2,693,035

TEMPLATE ADAPTED FOR THE USE OF TYPISTS

Hope G. Beck, Port Orchard, Wash.

Application June 17, 1952, Serial No. 293,946

3 Claims. (Cl. 33—174)

My invention relates to typing devices and, more particularly, to a template adapted for the use of typists. Briefly, my invention includes a folded sheet of flexible, transparent material having a series of openings, slots and indicia in one section whereby a typing sheet may be positioned between the sections of the ruler, with its top margin abutting the fold, to be measured and marked by means of the said openings, slots, and indicia.

Besides the actual operation of typing, a typist has various tasks in the arranging of the material to be typed on the sheet of typewriter paper. If the material is not properly oriented on the typing paper, the sheet is usually retyped so the orientation must be done with conerable care, which, however, means that it is time-consuming. Among the various measurements and marking of the typing paper are included marking of the top and botom margins where the typing is to begin and end, the center of the sheet, the location of punched holes for binding the typed papers, and the centering of headings on the page. Some of these preliminary arranging procedures include typing a heading or a footnote and counting the spaces in the heading or the line count in the footnote. Other time-consuming operations include the insertion of a number of sheets of typing paper and carbon in the machine which is sometimes difficult because of the thickness of the same. It will be observed that, unless these tasks are done with dispatch, they can very seriously cut down the actual typing rate of the typist.

The objects of my invention include, therefore, to devise a template adapted for the use of typists to facilitate the various measurements and markings incident to arranging typed material on a page to the end that these operations may be done more rapidly; to provide a guide for a bundle of typewriter sheets and carbon to facilitate insertion of the same in a machine; and to devise a typists' aid to facilitate the measurement of extraordinary insertions in a type page such as footnotes and headings.

My invention will be best understood, together with additional objectives and advantages thereof, by a reading of the following description, with reference to the drawings, in which:

Figure 1 is a perspective view of a specific embodiment of my typists' aid ruler or template shown in use on a typing sheet being marked to indicate a top typing margin;

Figure 2 is a face view of the template on an enlarged scale;

Figure 3 is an end view of the same, showing in full lines the normal position of the template and illustrating in dotted lines the flexibility of the material; and Figure 4 is a perspective view of the template with the top section folded back to illustrate the position of the ruler when a typing sheet is inserted.

The ruler or template is preferably formed of a unitary sheet of thin, transparent, flexible material folded to form two superposed sections, 10 and 12, having a stiff joint 14 therebetween whereby sections 10 and 12 tend to remain in abutment. It will be apparent that various types of plastic material may be used to form this ruler and there are species suitable for such use in several of the classes of such plastic materials. An example of such material is Pliofilm (rubber hydrochloride film). The indicia on the ruler or template may be printed on such material by a photographic process but it will be apparent that other types of printing would be suitable. The stiff joint 14 may be formed in Pliofilm by heat pressing. The film has considerable flexibility other than at said joint. It will be noted that joint 14 would not have to be stiff even though the ruler is handled with more facility when sections 10 and 12 tend to remain in superposition.

As the ruler may be used to guide the end of a pack of typewriter sheets, interposed with carbon, in inserting the same in a typewriter, the material should be capable of standing the stresses incident to running through the rolls of a typewriter. This does not mean that there can be no failure as it will be understood that these rulers can be made very economically so that mutilated rulers may be thrown away. Bottom section 12 is wider than section 10, which facilitates insertion of paper therebetween and the manual separation of the sections. The ruler preferably has a length parallel to fold 14 approximately the width of a typing sheet, i. e., eight, or eight and one-half inches.

One operation that the typist often does by measurement is to mark on the sheet to be typed lines indicating the top and bottom typing margins of the same. This is accomplished with the present ruler by means of a series of V-shaped slots 20 to be used in the manner shown in Figure 1. Slots 20 are marked with indicia 22 indicating the measurement from fold 14 to each slot 20, which, when the typing paper is abutted with fold 14, will be equal to the distance from the top or bottom of the typing sheet to the particular slot.

In centering a typing sheet in a typewriter in order to make uniform margins, the typist often marks the center of the sheet to be aligned with a number on the typewriter space scale. The center line is sometimes marked by manually folding the sheet and making a small crease at the center. The present ruler has slots 30 or openings 32 by which means the center of the sheet can be marked with a pencil in a uniform manner when an end edge of the ruler is aligned with the side margin of the paper. Central openings 30, 32 may also be used in marking the position of page numbers. In the same operation holes may be marked to be punched in the top binding of the typing sheet by means of openings 40 spaced apart in the conventional relationship, normally two and three-quarters inches center to center.

A pack of typing sheets, and interposed carbons, may be inserted between sections 10 and 12 and the ruler used as a guide through the rollers of the machine. In this case, the marginal stops of the typewriter may be set with reference to lines 50 extending perpendicular to fold 14, instead of relying on the scale on a typewriter under the assumption that the typing sheet is centered.

A time-consuming task of typists is the measuring of headings and the like to be centered on a page which is usually done by counting. The measurement is accomplished with my template by means of the two lines of numerical indicia 60 and 62 numbered consecutively from the center of section 10 in deciles. Line 60 is spaced according to elite type and line 62 is spaced according to standard or pica type. Lines 60 and 62 are placed on a copy of the heading with the center line approximately the center of the heading and then oriented until two numbers at either end of equal size are aligned with the ends. If the numbers are "9" at each end, then there are 18 spaces in the heading and the heading should be started 9 spaces from the center line of the typing sheet. It is also important in measuring footnotes and the like to have a ready line count and this is provided with the series of aligned consecutive numerical indicia 70 denominated "line count." The ruler may also be used as a buffer between paper and carbon for erasing.

It will be observed how the various objectives are met by my plastic ruler or template and the ruler forms a very useful tool for the typist to cut down the time taken in performing the various orienting typing operations.

Having thus described my invention, I claim:

1. A template adapted for the use of typists, comprising: a sheet of thin transparent material folded to form two superposed sections said sections being flexible enough to be rolled into a typewriter around the platen, said sections having a length parallel to said fold substantially the width of the conventional sheet of typing paper and being substantially narrower at right angles to said fold; a first of said sections having a series of openings and indicia, whereby a typing sheet, positioned between said sections with its top margin abutting said fold, may be marked and measured by means of said openings and indicia; said series of openings and indicia comprising, a series of openings spaced apart one from another along one end margin of said first section and having indicia marking the distance from said fold so that the top typing margin of such typing sheet may be marked, an opening positioned on the center line longitudinally of said first section for marking the center of such typing paper, a pair of openings disposed in relation to said fold in the same position as the conventional top marginal binding holes for typing paper, and numerical indicia running parallel to said fold on two lines with the numerals increasing from said center line and the numerals in one line being spaced according to standard type and the numerals of the other line being spaced according to elite type, whereby a heading on such typing paper may be measured.

2. A template adapted for the use of typists, comprising: a first and a second section of thin material connected on a common side margin by a fold line said sections being flexible enough to be rolled into a typewriter around the platen; a first of said sections being transparent and having a series of openings and indicia, whereby a typing sheet, positioned between said sections with its top margin abutting said fold, may be marked and measured by means of said openings and indicia, said first section having a length along said fold of approximately the width of the conventional typewritten sheet and being substantially narrower at right angles to said fold; said series of openings and indicia comprising, a series of openings spaced apart one from another along one end margin of said first section and open to that edge and having indicia marking the distance from said fold so that the top typing margin of such typing sheet may be marked, and numerical indicia on two lines running parallel to said fold with the numerals increasing from the center thereof in each line and the numerals being spaced according to a standard type on one line and according to an elite type on the other line.

3. A template adapted for the use of typists, comprising: a first and a second section of thin material connected on a common side margin by a fold line said sections being flexible enough to be rolled into a typewriter around the platen; a first of said sections being transparent and having a series of indicia whereby a typing sheet, positioned between said sections with its top or bottom margin abutting said fold, may be marked and measured by means of said indicia, said first section having a length along said fold of approximately the width of the conventional typewritten sheet and being substantially narrower at right angles to said fold; said indicia comprising, a series of notches uniformly spaced apart one from another along one end margin of said first section and marking measured distances from said fold so that the top or bottom typing margin of a typing sheet may be gauged or marked, and numerical indicia on a line running parallel to said fold with the numerals progressively increasing in each direction from the center thereof, the said numerals being spaced according to a standard type, whereby a heading on such typing paper may be centered.

References Cited in the file of this patent

UNITED STATES PATENTS

| Number | Name | Date |
|---|---|---|
| 274,031 | Regua | Mar. 13, 1883 |
| 689,354 | Colton | Dec. 17, 1901 |
| 1,006,393 | Montgomery | Oct. 17, 1911 |
| 1,132,261 | Heineck | Mar. 16, 1915 |
| 1,742,684 | Bowman | Jan. 7, 1930 |
| 1,791,124 | Dent | Feb. 3, 1931 |
| 2,375,427 | Mannino | May 8, 1945 |
| 2,418,421 | Murray | Apr. 1, 1947 |